(12) United States Patent
Itagaki et al.

(10) Patent No.: US 12,038,050 B2
(45) Date of Patent: Jul. 16, 2024

(54) TRIPOD-TYPE CONSTANT VELOCITY UNIVERSAL JOINT

(71) Applicant: NTN Corporation, Osaka (JP)

(72) Inventors: Taku Itagaki, Shizuoka (JP); Tatsuro Sugiyama, Shizuoka (JP); Shouta Kawata, Shizuoka (JP)

(73) Assignee: NTN CORPORATION, Osaka (JP)

( * ) Notice: Subject to any disclaimer, the term of this patent is extended or adjusted under 35 U.S.C. 154(b) by 400 days.

(21) Appl. No.: 17/414,436

(22) PCT Filed: Dec. 20, 2019

(86) PCT No.: PCT/JP2019/050225
§ 371 (c)(1),
(2) Date: Jun. 16, 2021

(87) PCT Pub. No.: WO2020/137924
PCT Pub. Date: Jul. 2, 2020

(65) Prior Publication Data
US 2022/0090635 A1   Mar. 24, 2022

(30) Foreign Application Priority Data
Dec. 27, 2018  (JP) .................................. 2018-245469

(51) Int. Cl.
*F16D 3/205* (2006.01)
(52) U.S. Cl.
CPC .... *F16D 3/2055* (2013.01); *F16D 2200/0021* (2013.01); *F16D 2250/0053* (2013.01); *Y10S 464/905* (2013.01)
(58) Field of Classification Search
CPC ........... F16D 3/2055; F16D 2200/0021; F16D 2250/0053; Y10S 464/905
(Continued)

(56) References Cited

U.S. PATENT DOCUMENTS 6,475,092 B1   11/2002 Kura et al.
6,478,682 B1 *  11/2002 Kura .................... F16D 3/2055
                                                           464/111
(Continued)

FOREIGN PATENT DOCUMENTS

CN   102859219   1/2013
CN   103958911   7/2014
(Continued)

OTHER PUBLICATIONS

SteelJIS, Japanese Steel Grading, retrieved from the internet Nov. 7, 2023 at <steeljis.com/jis_steel>. (Year: 2018).*
(Continued)

*Primary Examiner* — Greg Binda
(74) *Attorney, Agent, or Firm* — Wenderoth, Lind & Ponack, L.L.P.

(57) ABSTRACT

A tripod type constant velocity universal joint includes an outer joint member that includes track grooves, a tripod member that includes three leg shafts protruding in a radial direction, a roller that is inserted into the track groove, and an inner ring that is fitted onto the leg shaft, and rotatably supports the roller. A hardened layer is formed on a surface of each leg shaft by carburizing, hardening, and tempering. The tripod member is formed of a steel material having a carbon content of 0.23% to 0.44%. An effective hardened layer depth of the hardened layer by using, as a Ts torque, 0.3 times a minimum static torsional torque at which a shaft coupled to the tripod member causes torsional fracture and 600HV as limit hardness is equal to or greater than a maximum shear stress depth Z when the Ts torque is applied.

6 Claims, 5 Drawing Sheets

(58) Field of Classification Search
USPC .......................................................... 464/111
See application file for complete search history.

(56) References Cited

U.S. PATENT DOCUMENTS

| | | |
|---|---|---|
| 2003/0130045 A1 | 7/2003 | Kura et al. |
| 2004/0209693 A1 | 10/2004 | Kura et al. |
| 2012/0329564 A1 | 12/2012 | Itagaki et al. |
| 2014/0287841 A1 | 9/2014 | Miao et al. |
| 2017/0227060 A1 | 8/2017 | Miyamoto |
| 2018/0045249 A1 | 2/2018 | Sugiyama et al. |
| 2018/0259002 A1 | 9/2018 | Sugiyama |
| 2019/0101165 A1 | 4/2019 | Yamazaki et al. |

FOREIGN PATENT DOCUMENTS

| | | |
|---|---|---|
| CN | 205663784 | 10/2016 |
| CN | 107061530 | 8/2017 |
| CN | 107466341 | 12/2017 |
| JP | 2001-208091 | 8/2001 |
| JP | 3599618 | 12/2004 |
| JP | 2008-064158 | 3/2008 |
| JP | 2016-90028 | 5/2016 |
| JP | 2017-61988 | 3/2017 |
| JP | 2017-180675 | 10/2017 |
| JP | 2018-155378 | 10/2018 |
| JP | 2018-155379 | 10/2018 |

OTHER PUBLICATIONS

Notice of Reasons for Refusal issued Apr. 10, 2023 in corresponding Japanese Patent Application No. 2018-245469, with English-language translation.
International Search Report issued Mar. 17, 2020 in International (PCT) Application No. PCT/JP2019/050225.
International Preliminary Report on Patentability and Written Opinion of the International Searching Authority issued Jun. 16, 2021 in International (PCT) Application No. PCT/JP2019/050225.

* cited by examiner

| TRIPOD MEMBER SPECIFICATION | [SPECIFICATION 1] | [SPECIFICATION 2] | |
|---|---|---|---|
| CARBON CONTENT % OF STEEL MATERIAL (MATERIAL BEFORE HEAT TREATMENT) | LESS THAN 0.23 | 0.34 | 0.41 |
| HEAT TREATMENT | CARBURIZING, HARDENING, AND TEMPERING | CARBURIZING, HARDENING, AND TEMPERING | CARBURIZING, HARDENING, AND TEMPERING |
| EFFECTIVE HARDENED LAYER DEPTH UP TO 600HV | A | 2.0A | 2.5A |
| DURABILITY OF LEG SHAFT | △ | ○ | ◎ |

TRIPOD-TYPE CONSTANT VELOCITY UNIVERSAL JOINT

TECHNICAL FIELD

The present invention relates to a tripod type constant velocity universal joint used for power transmission of automobiles and various industrial machines.

BACKGROUND ART

In a drive shaft used in a power transmission system of an automobile, a plunging type constant velocity universal joint is coupled to an inboard side (center side in a vehicle width direction) of an intermediate shaft and a fixed type constant velocity universal joint is coupled to an outboard side (end portion side in the vehicle width direction) in many cases. The plunging type constant velocity universal joint here allows both angular displacement and relative movement in an axial direction between two axes, and the fixed type constant velocity universal joint allows the angular displacement between the two axes but does not allow relative movement in the axial direction between the two axes.

A tripod type constant velocity universal joint is known as the plunging type constant velocity universal joint. As this tripod type constant velocity universal joint, there are a single roller type and a double roller type. In the single roller type, a roller inserted into a track groove of an outer joint member is rotatably attached to a leg shaft of a tripod member via a plurality of needle rollers. The double roller type includes a roller inserted into a track groove of an outer joint member and an inner ring that is fitted onto a leg shaft of a tripod member to rotatably support the roller. Since the double roller type allows the roller to swing with respect to the leg shaft, there is an advantage that induced thrust (shaft force induced by friction between parts inside the joint) and slide resistance can be reduced compared to the single roller type. An example of the tripod type constant velocity universal joint of the double roller type is described in, for example, Japanese Patent No. 3599618.

CITATIONS LIST

Patent Literature

Patent Literature 1: Japanese Patent No. 3599618

SUMMARY OF INVENTION

Technical Problems

In the tripod type constant velocity universal joint of the double roller type described in Patent Literature 1, an outer peripheral surface of the leg shaft of the tripod member and an inner peripheral surface of the inner ring are in contact with each other in a form close to a point on a torque load side. Especially when a load torque is high, since a surface pressure at a contact portion becomes high, the durability of the outer peripheral surface of the leg shaft is influenced. When the durability of the leg shaft can be improved, the stable movement of the roller can be maintained, and the deterioration of vibration characteristics with time can be further prevented.

In order to improve the durability of the leg shaft, it is effective to increase a depth of a hardened layer formed on a surface of the leg shaft. However, in the tripod member, since it is common to form the hardened layer on the surface by apply carburizing, hardening, and tempering to case-hardened steel, a huge carburizing time is required to form a deeper hardened layer, and manufacturing cost increases.

Even though the depth of the hardened layer is increased, the verification of how deep the hardened layer is to be formed in order to secure the durability of the leg shaft has not sufficiently advanced.

As another countermeasure, it is considered that the tripod member is made of a steel material with an increased carbon content, for example, carbon steel for machine structure such as S50C to S55C (see JIS G 4051) and the hardened layer is formed on the surface by radio frequency hardening. However, in this method, since the steel material becomes hard due to the increase in the carbon content, a processing load when the tripod member is molded by a forging process increases. Thus, a size of forging equipment is increased and a lifespan of a forging die is shortened.

Thus, an object of the present invention is to improve durability of a leg shaft of a tripod member while suppressing an increase in manufacturing cost.

Solutions to Problems

In order to solve the above problems, it is effective to form a deeper hardened layer having high hardness as already described. In order to solve the above-mentioned problems through the verification of the present inventors, it was found that a carbon content in a steel material as a material of a tripod member is increased as compared with a steel material used in the related art and an effective hardened layer depth (limit hardness 600 HV) of a hardened layer is set to be equal to or greater than a maximum shear stress depth corresponding to a torque applied to a tripod type constant velocity universal joint.

The present invention made based on the above findings provides a tripod type constant velocity universal joint including an outer joint member that includes track grooves extending in an axial direction at three locations in a circumferential direction, and has a pair of roller guide surfaces on which the track grooves are arranged so as to face each other in a circumferential direction, a tripod member that includes three leg shafts protruding in a radial direction, a roller that is inserted into the track groove, and an inner ring that is fitted on the leg shaft, and rotatably supports the roller. A roller unit including the roller and the inner ring is able to swing with respect to the leg shaft, the roller unit is configured to be movable in an axial direction of the outer joint member along the roller guide surface, and a hardened layer is formed on a surface of each leg shaft of the tripod member by carburizing, hardening, and tempering, the tripod member is made of a steel material having a carbon content of 0.23% to 0.44%, and an effective hardened layer depth of the hardened layer by using, as a Ts torque, 0.3 times a minimum static torsional torque at which a shaft coupled to the tripod member causes torsional fracture and 600 HV as limit hardness is equal to or greater than a maximum shear stress depth when the Ts torque is applied.

From such a configuration, it is possible to improve the durability of the leg shaft. Accordingly, it is possible to suppress a situation where the movement of the roller is hindered, and it is possible to prevent vibration characteristics from deteriorating with time. On the other hand, since the carbon content of the steel material is regulated to 0.44% or less, the forging formability of the tripod member does not deteriorate extremely, and the forging cost of the tripod member can be prevented from rising.

The maximum shear stress depth is decided based on the concept of the Ts torque as described above, and thus, the effective hardened layer depth can be decided in a form suitable for an actual usage condition. Accordingly, the above-mentioned effects can be stably obtained regardless of the size of the tripod type constant velocity universal joint.

In the tripod type constant velocity universal joint, it is preferable that an outer peripheral surface of the leg shaft has a straight shape in a longitudinal cross section and has a substantially elliptical shape in a traversal cross section, an inner peripheral surface of the inner ring is formed as a convex curved surface, and an outer peripheral surface of the leg shaft is in contact with the inner peripheral surface of the inner ring in a direction orthogonal to an axis of the joint, and forms a gap with the inner peripheral surface of the inner ring in an axial direction of the joint.

The present invention provides a tripod type constant velocity universal joint including an outer joint member that includes track grooves extending in an axial direction at three locations in a circumferential direction, and has a pair of roller guide surfaces on which the track grooves are arranged so as to face each other in a circumferential direction, a tripod member that includes three leg shafts protruding in a radial direction, and a roller that is rotatably attached to each leg shaft via a plurality of needle rollers. The roller is configured to be movable in an axial direction of the outer joint member along the roller guide surface, a hardened layer is formed on a surface of each leg shaft of the tripod member by carburizing, hardening, and tempering, the tripod member is made of a steel material having a carbon content of 0.23% to 0.44%, and an effective hardened layer depth of the hardened layer by using, as a Ts torque, 0.3 times a minimum static torsional torque at which the shaft coupled to the tripod member causes torsional fracture and 600 HV as limit hardness is equal to or greater than a maximum shear stress depth when the Ts torque is applied.

The internal hardness after carburizing, hardening, and tempering is increased, and thus, the depth of the effective hardened layer can be increased. The internal hardness is set to 513 HV or more, it is possible to obtain an effective hardened layer depth (limit hardness: 600 HV) equal to or greater than the maximum shear stress depth as described above.

It is preferable that a surface hardness of each leg shaft of the tripod member is 653 HV or more in order to suppress wear due to rolling of a mating part with respect to the leg shaft.

Advantageous Effects of Invention

According to the present invention, it is possible to improve the durability of the leg shaft of the tripod member while suppressing the increase in manufacturing cost.

DESCRIPTION OF EMBODIMENTS

A first embodiment of a tripod type constant velocity universal joint according to the present invention will be described with reference to FIGS. 1 to 9.

Figure 1:
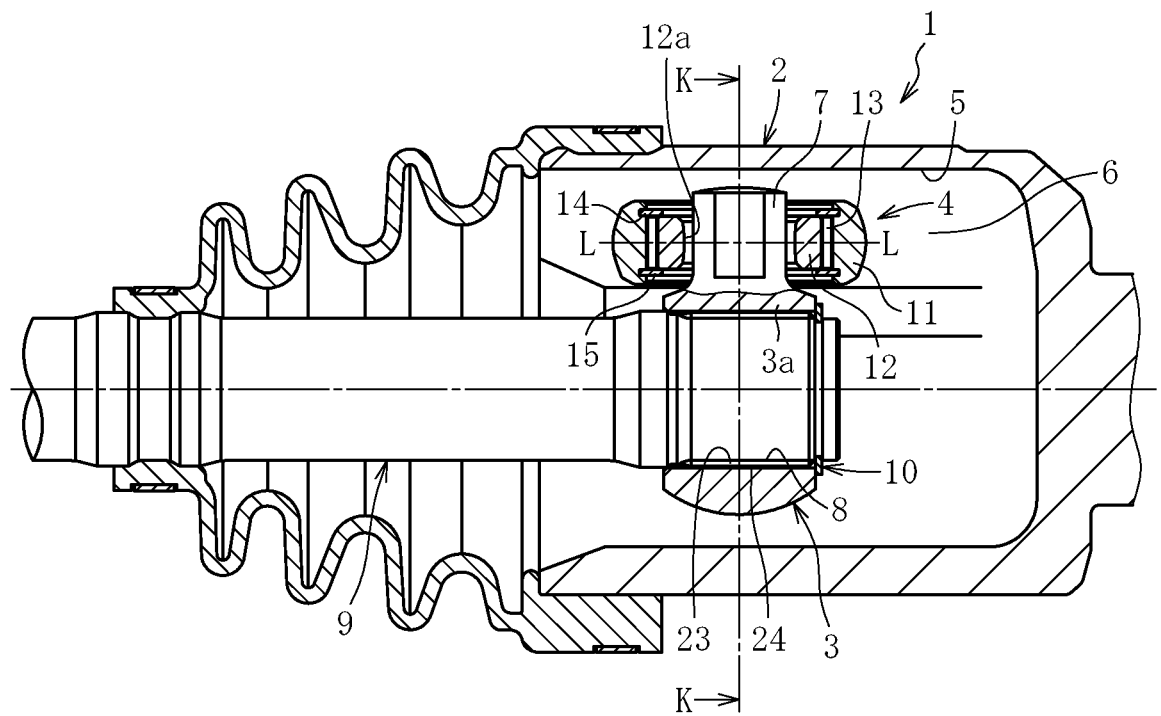
FIG. 1 is a longitudinal cross-sectional view of a first embodiment of a tripod type constant velocity universal joint.
Figure 2:
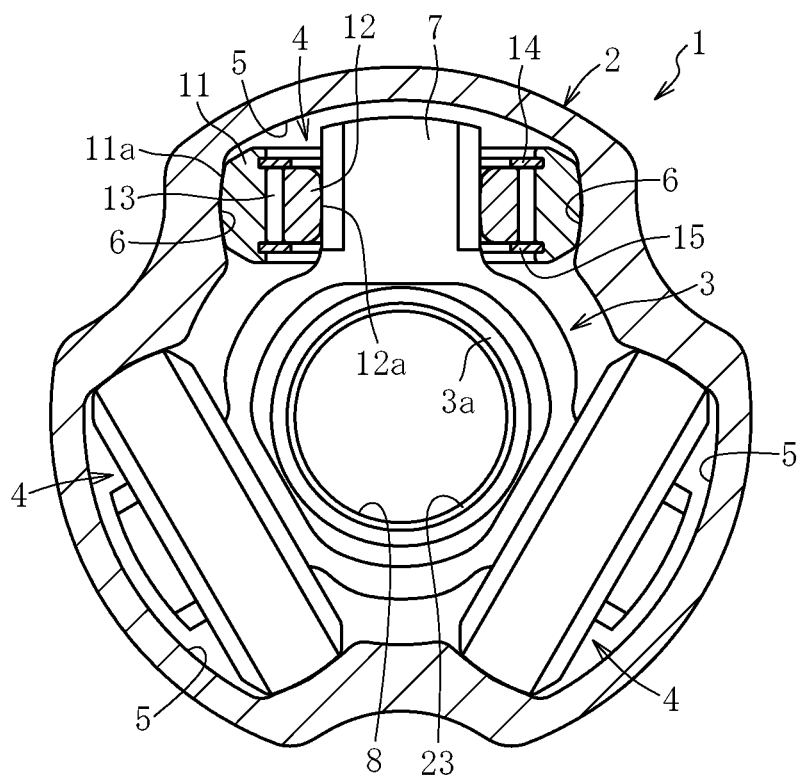
FIG. 2 is a traversal cross-sectional view taken along a line K-K of FIG. 1.
Figure 3:
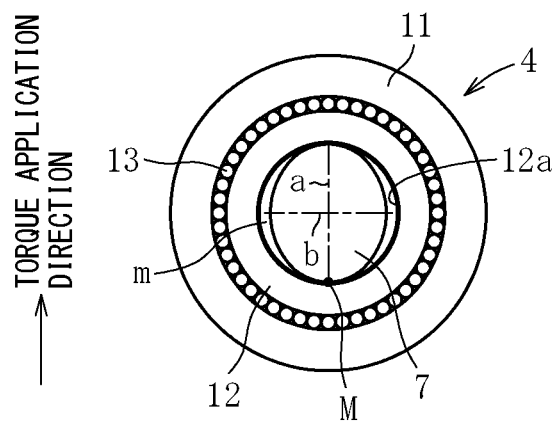
FIG. 3 is a traversal cross-sectional view taken along a line L-L of FIG. 1.
Figure 4:
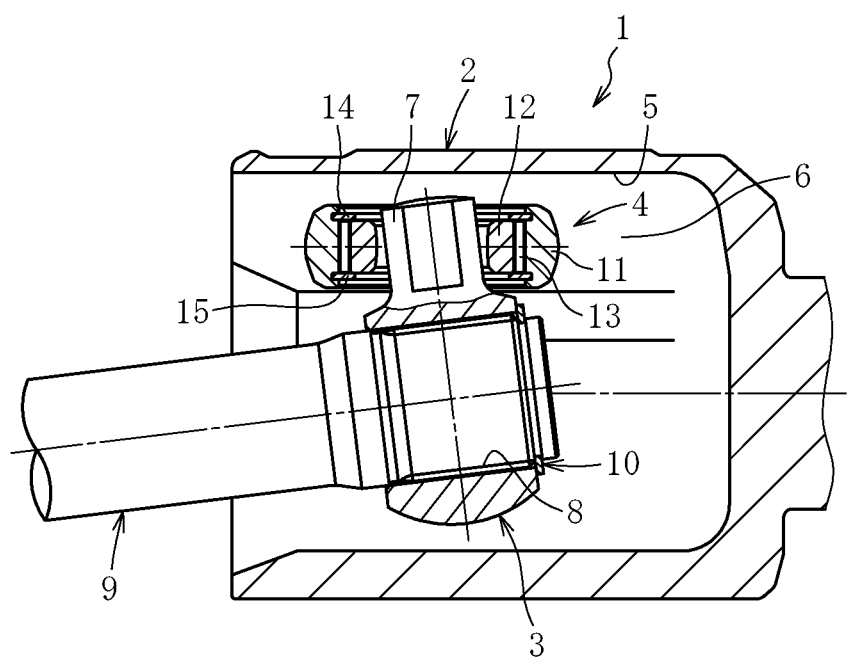
FIG. 4 is a longitudinal cross-sectional view showing a state in which the tripod type constant velocity universal joint of FIG. 1 has an operating angle.

A tripod type constant velocity universal joint 1 of the present embodiment shown in FIGS. 1 to 4 is a double roller type. FIG. 1 is a longitudinal cross-sectional view showing the tripod type constant velocity universal joint of the double roller type, and FIG. 2 is a partial traversal cross-sectional view taken along a line K-K of FIG. 1. FIG. 3 is a traversal cross-sectional view taken along a line L-L of FIG. 1, and FIG. 4 is a longitudinal cross-sectional view showing the tripod type constant velocity universal joint when an operating angle is taken.

As shown in FIGS. 1 and 2, the tripod type constant velocity universal joint 1 includes, as main components, an outer joint member 2, a tripod member 3 as an inner joint member, and a roller unit 4 as a torque transmitting member. The outer joint member 2 has a cup shape with one opened end, and three linear track grooves 5 extending in an axial direction are formed on an inner peripheral surface at equal intervals in a circumferential direction. Roller guide surfaces 6, which extend in the axial direction of the outer joint member 2, are formed in each track groove 5 so as to face each other in the circumferential direction of the outer joint member 2. The tripod member 3 and the roller unit 4 are housed inside the outer joint member 2.

The tripod member 3 integrally has a trunnion body portion 3a and three leg shafts 7 (trunnion journals) protruding in a radial direction from trisection positions of the trunnion body portion 3a in the circumferential direction. The tripod member 3 is coupled to a shaft 9 in a torque transmittable manner by fitting a male spline 24 (see FIG. 1) formed on the shaft 9 to a female spline 23 formed in a central hole 8 of the trunnion body portion 3a. A retaining ring 10 mounted on a distal end of the shaft 9 is engaged to an end surface of the tripod member 3, and thus, the tripod member 3 is fixed to the shaft 9 in the axial direction.

The roller unit 4 includes, as main components, an outer ring 11 which is a roller, an annular inner ring 12 which is disposed inside the outer ring 11 and is fitted onto the leg shaft 7, and a large number of needle rollers 13 interposed between the outer ring 11 and the inner ring 12, and is housed in the track groove 5 of the outer joint member 2. The roller unit 4 including the inner ring 12, the needle rollers 13, and the outer ring 11 has a structure that is not separated by washers 14 and 15.

In this embodiment, an outer peripheral surface of the outer ring 11 is a convex curved surface with an arc having a center of curvature on an axis of the leg shaft 7 as a busbar.

The outer peripheral surface of the outer ring 11 is in angular contact with the roller guide surface 6.

The needle rollers 13 are arranged between a cylindrical inner peripheral surface of the outer ring 11 as an outer raceway surface and a cylindrical outer peripheral surface of the inner ring 12 as an inner raceway surface, and can roll freely between the outer raceway surface and the inner raceway surface.

An outer peripheral surface of each leg shaft 7 of the tripod member 3 has a straight shape in a longitudinal cross section including the axis of the leg shaft 7. As shown in FIG. 3, the outer peripheral surface of the leg shaft 7 has a substantially elliptical shape in a cross section orthogonal to the axis of the leg shaft 7. The outer peripheral surface of the leg shaft 7 is in contact with an inner peripheral surface 12a of the inner ring 12 in a direction orthogonal to an axis of the joint, that is, in a direction of a major axis a. In an axial direction of the joint, that is, in a direction of a minor axis b, a gap m is formed between the outer peripheral surface of the leg shaft 7 and the inner peripheral surface 12a of the inner ring 12.

The inner peripheral surface 12a of the inner ring 12 has a convex curved surface shape, specifically, a convex arc shape in a longitudinal cross section including an axis of the inner ring 12. Since the inner peripheral surface has such a shape and the cross-sectional shape of the leg shaft 7 is substantially elliptical as described above and the predetermined gap m is provided between the leg shaft 7 and the inner ring 12, the inner ring 12 can swing with the leg shaft 7. As described above, since the inner ring 12 and the outer ring 11 are assembled so as to be relatively rotatable via the needle rollers 13, the outer ring 11 is integrated with the inner ring 12 and can swing with respect to the leg shaft 7. That is, in a plane including the axis of the leg shaft 7, the axes of the outer ring 11 and the inner ring 12 can tilt with respect to the axis of the leg shaft 7 (see FIG. 4).

As shown in FIG. 4, when the tripod type constant velocity universal joint 1 rotates at an operating angle, an axis of the tripod member 3 tilts with respect to the axis of the outer joint member 2, but since the roller unit 4 can swing, it is possible to prevent the outer ring 11 and the roller guide surface 6 from being obliquely crossed. Accordingly, since the outer ring 11 rolls horizontally with respect to the roller guide surface 6, induced thrust and slide resistance can be reduced, and low vibration of the joint can be achieved.

As already described, since the cross section of the leg shaft 7 is substantially elliptical and the cross section of the inner peripheral surface 12a of the inner ring 12 is the arc-shaped convex cross section, the outer peripheral surface of the leg shaft 7 on a torque load side and the inner peripheral surface 12a of the inner ring 12 on the torque load side are in contact with each other in a narrow area close to point contact. Thus, a force to tilt the roller unit 4 is decreased, and stability of a pose of the outer ring 11 is improved.

The tripod member 3 described above is manufactured by using a steel material through main processes such as a forging process→a machining (turning) process→carburizing, hardening, and tempering processes→a grinding process of the outer peripheral surface of the leg shaft 7. The outer peripheral surface of the leg shaft 7 may be finished by hardened steel cutting instead of the grinding process.

Figure 5:
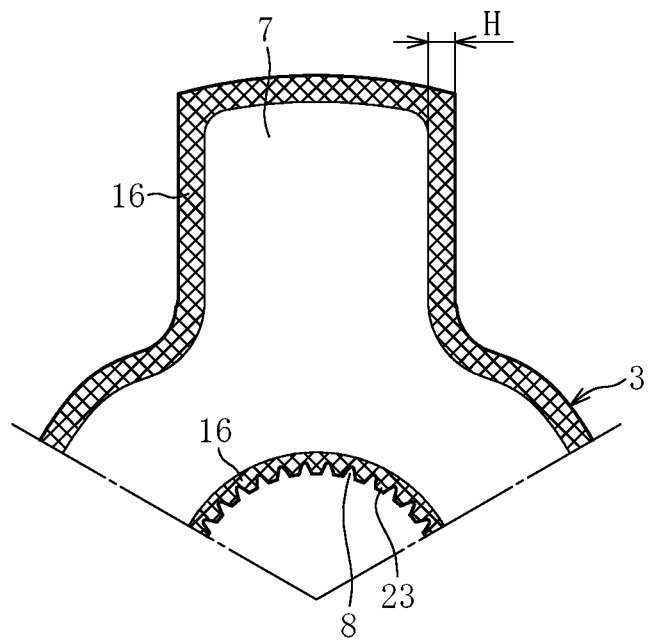
FIG. 5 is a longitudinal cross-sectional view showing a hardened layer formed on a tripod member.

FIG. 5 is a cross-sectional view showing a hardened layer 16 formed on the tripod member 3. As shown in FIG. 5, the hardened layer 16 is formed on the entire surface of the tripod member including the outer peripheral surface of the leg shaft 7 and the female spline 23. Since the tripod member 3 as a finished product is finished by grinding the outer peripheral surface of the leg shaft 7 (or hardened steel cutting), a depth of the hardened layer 16 on the outer peripheral surface of the leg shaft 7 is shallower than other regions by a grinding allowance due to grinding or the like. Since this grinding allowance is usually as small as about 0.1 mm, a thickness of the hardened layer 16 is drawn uniformly on the entire surface in FIG. 5.

Incidentally, as already described, in the tripod type constant velocity universal joint of the double roller type, as shown in FIG. 3, since the outer peripheral surface of the leg shaft 7 and the inner peripheral surface 12a of the inner ring 12 are in contact with each other in a region M close to a point, there is a problem that a surface pressure at the contact portion becomes high when a high torque load is applied. When the surface pressure becomes excessive, the durability of the leg shaft 7 deteriorates.

In order to cope with this problem, in the present embodiment, it was conceived that a hardened layer with high hardness is formed deeply. Based on this idea, as a material of the tripod member 3, a carbon content in the steel material was increased compared to the steel material used in the related art, and an effective hardened layer depth of the hardened layer was set as the depth corresponding to the torque applied to the tripod type constant velocity universal joint. Hereinafter, the carbon content and the effective hardened layer depth will be described below.

(1) Increase in Carbon Content

As the material of the tripod member 3 of the related art, chrome-molybdenum steel which is a kind of case-hardened steel is used in many cases. In the present embodiment, a steel material having a carbon content of more than 0.23% (preferably a steel material having a carbon content of 0.24% or more, more preferably 0.32% or more) is used as the material ("%" representing the carbon content means "mass %"). However, when the carbon content is too large, since the formability at the time of forging the tripod member deteriorates, a steel material having a carbon content of 0.44% or less is used. Examples of the case-hardened steel that meets this condition include chrome-molybdenum steel SCM435 or SCM440 specified in JIS G 4053. As the steel material, it is preferable to use so-called H-beams (SCM435H and SCM440H) specified in JIS G 4052 of which hardenability is guaranteed. Incidentally, according to JIS G 4052, a carbon content of SCM435H is 0.32% to 0.39%, and a carbon content of SCM440 is 0.37% to 0.44%.

Other types of steel materials, for example, chrome steel (SCr435, SCr440, and the like) specified in JIS G 4053 may be used as long as the case-hardened steel satisfies the above carbon content (0.23% to 0.44% or less). As the chrome steel, it is preferable to use H-beams such as SCr435H and SCr440H as described above. Incidentally, a carbon content of SCr435H is 0.32% to 0.39%, and the carbon content of SCr440H is 0.37% to 0.44%.

(2) Setting of Effective Hardened Layer Depth

In the present embodiment, an effective hardened layer depth H (limit hardness 600 HV) of the hardened layer 16 formed on the surface of the tripod member 3 is equal to or greater than a maximum shear stress depth Z when a Ts torque is applied to the tripod type constant velocity universal joint 1 (H≥Z).

Figure 6:
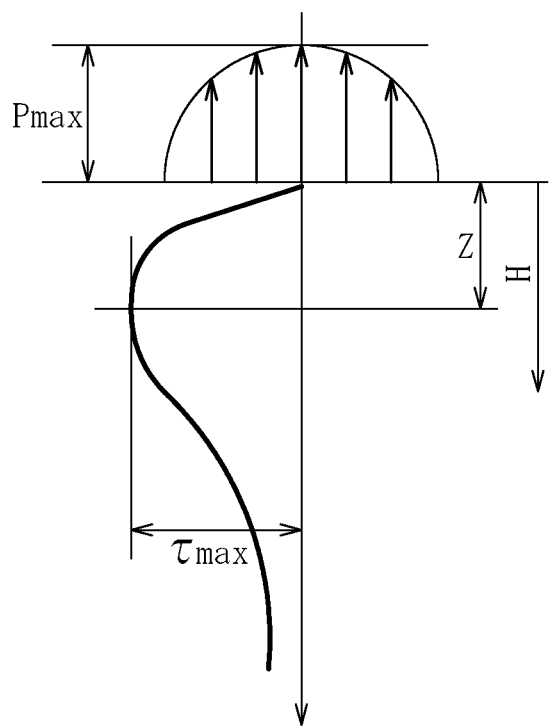
FIG. 6 is a diagram for describing a surface pressure distribution of a contact ellipse and a change in shear stress in a depth direction.

The "Ts torque" referred to here is a value 0.3 times a minimum static torsional torque at which the shaft 9 coupled to the tripod member 3 causes torsional fracture. When the Ts torque is applied to the tripod type constant velocity universal joint 1, a contact ellipse is created on the outer peripheral surface of the leg shaft 7 constituting a contact portion M (see FIG. 3) on a load side with the inner peripheral surface 12a of the inner ring 12. At this time, as shown in FIG. 6, a center of the contact ellipse has a maximum surface pressure Pmax. A depth at which a maximum shear stress τmax is generated on the center of the contact ellipse in a direction directly below the leg shaft (inner diameter side of the leg shaft 7) is the "maximum shear stress depth Z".

The effective hardened layer depth means a distance from a surface of the steel material to a position of limit hardness. According to JIS G 0557, although the limit hardness of the effective hardened layer is 550 HV, "when the hardness of the hardened layer at a distance of 3 times from the surface exceeds the Vickers hardness of 450 HV, the limit hardness exceeding 550 HV may be used by agreement between the parties". In the present embodiment, since the internal hardness (hardness of a non-hardened region) of the tripod member 3 is 513 HV or more as will be described later, in the present embodiment, the limit hardness of the effective hardened layer depth is specified at 600 HV as an exception example. Since as the hardness of the hardened layer 16 becomes harder, the hardness becomes more preferable in terms of the durability of the leg shaft 7, it is preferable to specify the limit hardness of the effective hardened layer depth to 653 HV or more.

The internal hardness after carburizing, hardening, and tempering is increased, and thus, the depth of the effective hardened layer can be increased. The internal hardness is increased to 513 HV or more, and thus, it is possible to obtain an effective hardened layer depth (limit hardness 600 HV) equal to or greater than the maximum shear stress depth as described above.

It is preferable to set the surface hardness of the leg shaft 7 to 653 HV or more in order to suppress wear due to rolling of a mating part (inner ring 12 in the present embodiment) with respect to the leg shaft.

Figure 7:
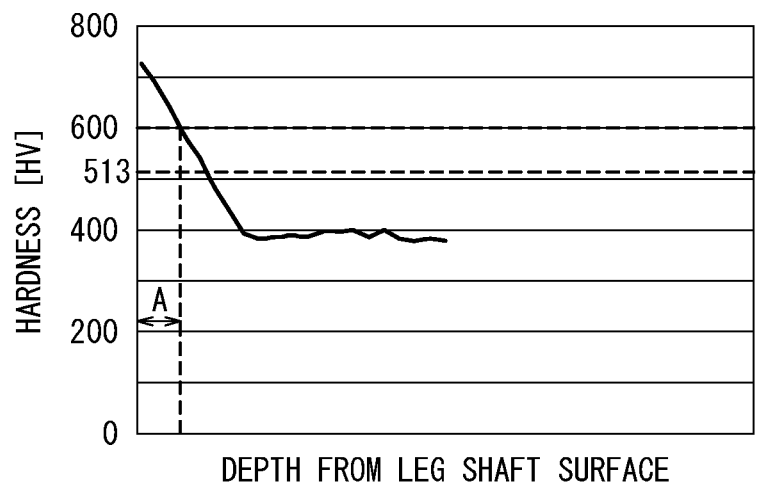
FIG. 7 is a graph showing a hardness distribution of a conventional product.
Figure 8:
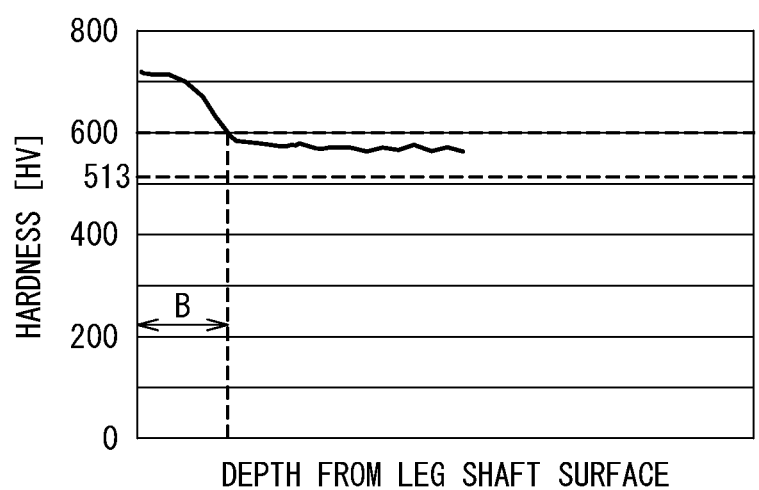
FIG. 8 is a graph showing a hardness distribution of an example product.

FIGS. 7 and 8 are diagrams showing hardness distributions when a depth from the surface of the leg shaft is taken as a horizontal axis. The hardness is measured at the contact portion M of the outer peripheral surface of the leg shaft 7 that comes into contact with the inner peripheral surface 12a of the inner ring 12. Of both figures, FIG. 7 shows a hardness distribution of a conventional product, and FIG. 8 shows a hardness distribution of an example product using a high carbon content steel material (material equivalent to a carbon content of 0.34%). The effective hardened layer depth when 600 HV is the limit hardness is represented by "A" in FIG. 7 and "B" in FIG. 8. It was clarified that there was a difference in the carbon content in this manner, and thus, there was a difference in the effective hardened layer depth even though carburizing, hardening, and tempering are performed under the same treatment condition (A<B).

Figures 9, 10:
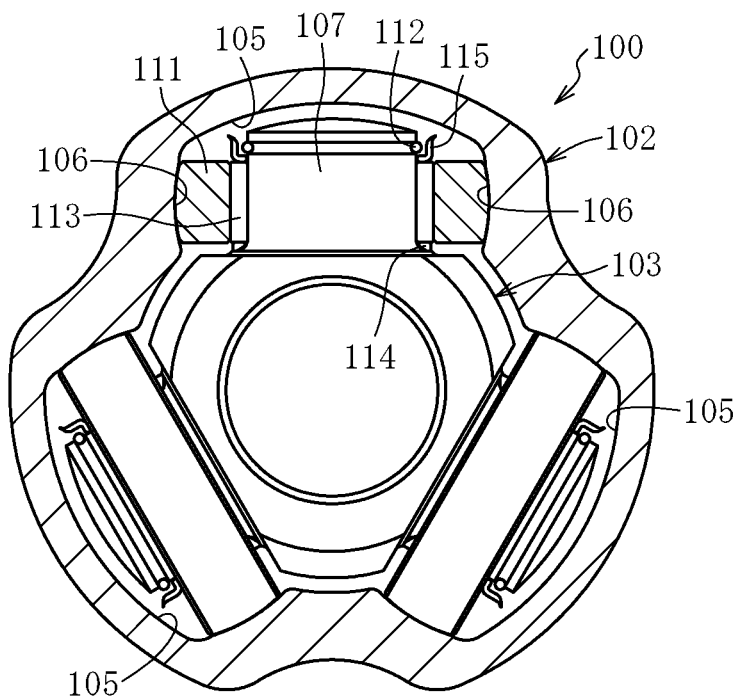
FIG. 9 is a table showing measurement results of an effective hardened layer depth and durability of a leg shaft.
FIG. 10 is a traversal cross-sectional view of a tripod type constant velocity universal joint according to another embodiment.

FIG. 9 shows results obtained by actually measuring the effective hardened layer depth and evaluating the durability of the leg shaft 7 for the conventional product (specification 1) and two example products (specification 2). In the example products, two types of steel materials of a material equivalent to a carbon content of 0.34% and a material equivalent to a carbon content of 0.41% are used. The limit hardness of the effective hardened layer depth is 600 HV. Of evaluation indexes represented in "leg shaft durability", "□" means "target characteristic unsatisfied", "○" means "target characteristic satisfied", and "⊡" means "target characteristics sufficiently satisfied".

Although steel types used are different between the conventional product and the example products, the size and heat treatment (carburizing, hardening, and tempering) conditions are the same. For carburizing and hardening, a procedure of holding an intermediate product of the tripod member at about 850° C. for 1 hour, heating the intermediate product to about 940° C., carburizing the intermediate product at this temperature for 3 hours, cooling the intermediate product to about 860° C. by furnace cooling, holding the intermediate product in this state for 30 minutes, and then oil hardening the intermediate product was adopted. Tempering is performed under a condition in which the intermediate product is held at about 180° C. for 40 minutes.

As is clear from FIG. 9, it was confirmed that an effective hardened layer depth was doubled (2.0A) when the material equivalent to the carbon content of 0.34% which has a large amount of carbon content was used as compared with an effective hardened layer depth A of the conventional product and an effective hardened layer depth was 2.5 times (2.5A) when the material equivalent to the carbon content of 0.41% which was even a larger amount of carbon content was used. It was also found that the durability of the leg shaft reached the target characteristics with the carbon content of 0.34% and reached the target characteristics with the material equivalent to the carbon content of 0.41% with a margin.

From the results shown in FIG. 8, in the example products, the decrease in the hardness from the surface to the inside can be suppressed, and the hardness of 513 HV which is the target characteristics can be maintained even inside. Accordingly, the effective hardened layer depth H of the hardened layer 16 can be set to the maximum shear stress depth Z or more when the Ts torque is applied to the tripod type constant velocity universal joint 1. Accordingly, the durability of the leg shaft can be improved in the tripod type constant velocity universal joint of the double roller type in which the outer peripheral surface of the leg shaft 7 and the inner peripheral surface 12a of the inner ring 12 are in contact with each other in the region close to the point on the torque load side. Accordingly, it is possible to suppress a situation where the movement of the roller unit 4 is hindered, and it is possible to prevent vibration characteristics from deteriorating with time.

On the other hand, since the carbon content is regulated to 0.44% or less, the forging formability of the tripod member 3 does not deteriorate extremely, and the forging cost of the tripod member 3 can be prevented from rising.

Since the maximum shear stress depth is decided based on the concept of the Ts torque as in the present embodiment, the effective hardened layer depth can be decided in a form suitable for an actual usage condition. Accordingly, the above-mentioned effects can be stably obtained regardless of the size of the tripod type constant velocity universal joint.

The present invention is not limited to the embodiment described above, and can be applied to a tripod type constant velocity universal joint of a double roller type having another configuration.

For example, the outer peripheral surface of the leg shaft 7 may be formed into a convex curved surface (for example, a convex arc shape in a cross section), and the inner peripheral surface 12a of the inner ring 12 may be formed into a cylindrical surface shape. The outer peripheral surface of the leg shaft 7 may be formed into a convex curved surface (for example, a convex arc shape in cross section), and the inner peripheral surface 12a of the inner ring 12 may be formed into a concave spherical surface that fits with the outer peripheral surface of the leg shaft. At this time, the washers 14 and 15 can be eliminated by providing brims at both ends of the inner diameter of the outer ring.

Next, a second embodiment of the present invention will be described with reference to FIG. 10.

FIG. 10 is a traversal cross-sectional view of a tripod type constant velocity universal joint 100 of a single roller type according to the second embodiment.

As shown in FIG. 10, the tripod type constant velocity universal joint 100 includes, as main components, an outer joint member 102, a tripod member 103 as an inner joint member, a roller 111 as a torque transmitting member, and a needle roller 113 as a rolling element. The outer joint member 102 has a hollow cup shape having three track grooves 105 extending in an axial direction at an inner periphery thereof at three equal positions in a circumferential direction. Roller guide surface 106 are formed on side walls of the track grooves 105 facing each other in the circumferential direction. The roller guide surface 106 is formed by a part of a cylindrical surface, that is, a partial cylindrical surface.

The tripod member 103 has three leg shafts 107 protruding from a trunnion body portion in a radial direction at three equal positions in the circumferential direction. The tripod member 103 is spline-fitted to the shaft in a torque transmittable manner. The roller 111 is rotatably mounted around a cylindrical outer peripheral surface of the leg shaft 107 via a plurality of needle rollers 113. The outer peripheral surface of the leg shaft 7 forms an inner raceway surface of the needle rollers 113. An inner diameter surface of the roller 111 is cylindrical and forms an outer raceway surface of the needle rollers 113.

A retaining ring 112 is mounted near a shaft end of the trunnion journal 9 via an outer washer 115. The needle roller 113 is regulated from moving in the axial direction of the leg shaft 107 by an inner washer 114 and the outer washer 115.

The roller 111 rotatably mounted on the leg shaft 7 of the tripod member 103 is rotatably guided to the roller guide surface 106 of the track groove 105 of the outer joint member 102. With such a structure, relative displacement in the displacement in the axial direction and angular displacement between the outer joint member 102 and the tripod member 103 are absorbed, and the rotation is transmitted at a constant velocity.

As in the first embodiment already described, in the tripod type constant velocity universal joint 100 of the single roller type described above, the tripod member 103 is formed a steel material having a carbon content of 0.23% to 0.44% and the effect hardened layer depth H by using, as the Ts torque, 0.3 times the minimum static torsional torque at which the shaft 9 coupled to the tripod member 103 causes torsional fracture and 600 HV as the limit hardness is set to be equal to or greater than the maximum shear stress depth Z when the Ts torque is applied (H≥Z). Accordingly, the same effects can be obtained as in the first embodiment by improving the durability of the leg shaft 107.

The tripod type constant velocity universal joints 1 and 100 described above are not limited to a drive shaft of an automobile, and can be widely used in a power transmission path of an automobile, an industrial device, or the like.

REFERENCE SIGNS LIST 1,100 Tripod type constant velocity universal joint
2,102 Outer joint member
3,103 Tripod member
4 Roller unit
5,105 Track groove
6,106 Roller guide surface
7,107 Leg shaft
9 Shaft
11 Roller (outer ring)
12 Inner ring
13,113 Needle roller
16 Hardened layer
111 Roller

The invention claimed is:

1. A tripod type constant velocity universal joint comprising:
    an outer joint member that includes track grooves extending in an axial direction at three locations in a circumferential direction, each of the track grooves having a pair of roller guide surfaces arranged so as to face each other in the circumferential direction;
    a tripod member that includes three leg shafts protruding in a radial direction; and
    rollers that are rotatably attached to the leg shafts via a plurality of needle rollers, wherein
    each of the rollers is configured to be movable in an axial direction of the outer joint member along one of the roller guide surfaces,
    a hardened layer is formed on a surface of each of the leg shafts of the tripod member by carburizing, hardening, and tempering,
    the tripod member is made of a steel material having a carbon content of 0.32% or more and 0.44% or less,
    an effective hardened layer depth of the hardened layer by using, as a Ts torque, 0.3 times a minimum static torsional torque at which a shaft coupled to the tripod member causes torsional fracture and 600HV as limit hardness is equal to or greater than a maximum shear stress depth when the Ts torque is applied, and
    an internal hardness of the tripod member is 513Hv or more.

2. The tripod type constant velocity universal joint according to claim 1, wherein a surface hardness of each of the leg shafts of the tripod member is 653Hv or more.

3. A tripod type constant velocity universal joint comprising:
    an outer joint member that includes track grooves extending in an axial direction at three locations in a circumferential direction, each of the track grooves having a pair of roller guide surfaces arranged so as to face each other in the circumferential direction;
    a tripod member that includes three leg shafts protruding in a radial direction;
    rollers that are inserted into the track grooves; and
    inner rings that are fitted onto the leg shafts, and rotatably support the rollers, wherein
    for each of the leg shafts, a roller unit including the roller and the inner ring is able to swing with respect to the leg shaft,
    each of the roller units is configured to be movable in an axial direction of the outer joint member along one of the roller guide surfaces,
    a hardened layer is formed on a surface of each of the leg shafts of the tripod member by carburizing, hardening, and tempering,
    the tripod member is made of a steel material having a carbon content of 0.32% or more and 0.44% or less,
    an effective hardened layer depth of the hardened layer by using, as a Ts torque, 0.3 times a minimum static torsional torque at which a shaft coupled to the tripod member causes torsional fracture and 600HV as limit hardness is equal to or greater than a maximum shear stress depth when the Ts torque is applied, and an internal hardness of the tripod member is 513Hv or more.

4. The tripod type constant velocity universal joint according to claim 3, wherein
an outer peripheral surface of each of the leg shafts has a straight shape in a longitudinal cross section and has a substantially elliptical shape in a traversal cross section,
an inner peripheral surface of each of the inner rings is formed as a convex curved surface, and
the outer peripheral surface of each of the leg shafts is in contact with the inner peripheral surface of one of the inner rings in a direction orthogonal to an axis of the tripod type constant velocity universal joint, and forms a gap with the inner peripheral surface of the one of the inner rings in an axial direction of the tripod type constant velocity universal joint.

5. The tripod type constant velocity universal joint according to claim 4, wherein a surface hardness of each of the leg shafts of the tripod member is 653Hv or more.

6. The tripod type constant velocity universal joint according to claim 3, wherein a surface hardness of each of the leg shafts of the tripod member is 653Hv or more.

* * * * *